Sept. 8, 1925.    J. W. BRANSON    1,552,983
THERMOSTATIC VALVE
Original Filed Nov. 29, 1922

INVENTOR.
John W. Branson
BY
ATTORNEYS.

Patented Sept. 8, 1925.

1,552,983

UNITED STATES PATENT OFFICE.

JOHN W. BRANSON, OF WALLACE, VIRGINIA.

THERMOSTATIC VALVE.

Original application filed November 29, 1922, Serial No. 604,048. Divided and this application filed July 2, 1924. Serial No. 723,817.

*To all whom it may concern:*

Be it known that I, JOHN W. BRANSON, a citizen of the United States, residing at Wallace, in the county of Washington and State of Virginia, have invented certain new and useful Improvements in Thermostatic Valves, of which the following is a specification, reference being had therein to the accompanying drawings.

This invention relates to a thermostatic valve, and the object of the invention is to produce a simple and efficient thermostatic valve used in connection with a brooder stove, or with a brooder, or an incubator, or the like.

This application is a divisional case, growing out of my original United States application, Serial No. 604,048, relating to a "brooder stove," filed November 29, 1922, and patented July 15, 1924, Pat. No. 1,501,434.

With the foregoing and other objects in view, by invention comprises certain novel combinations, constructions and arrangements of parts as will be hereinafter described, illustrated in the accompanying drawings, and more particularly pointed out in the appended claims.

Figure 1:
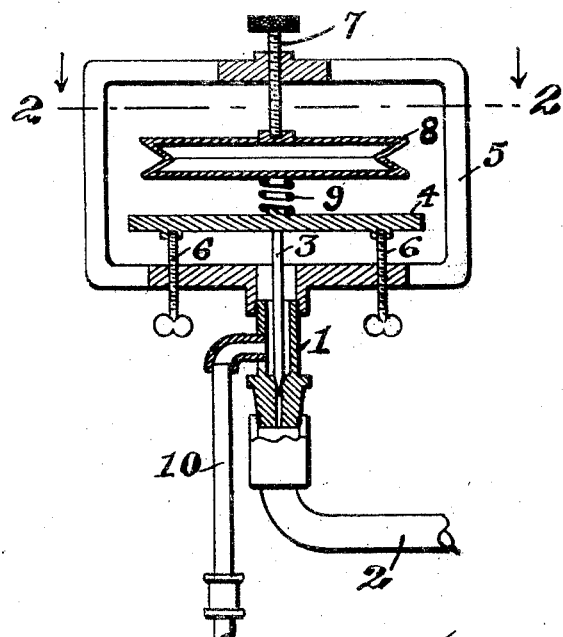
Figure 1 is a view, in elevation, shown partly in section of a thermostatic valve device constructed in accordance with the present invention.
Figure 2:
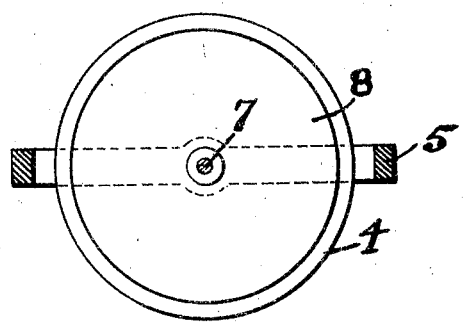
Figure 2 is a sectional view, taken on line 2—2, Fig. 1, and looking in the direction of the arrows.

Referring to the drawings by numerals: This invention is used in connection with brooder stoves, or brooders, or incubators, and the object particularly is to automatically control the flow or supply of fuel or oil to the stove, hence, in carrying out my invention I provide a valve casing 1, to which is connected the supply pipe 2, and in which is mounted a needle valve 3. The upper end of the needle valve 3 is secured to a plate or disc 4. A frame 5 is provided, upon the body of which are mounted screws 6, which are connected at their upper ends to the disc 4.

A screw 7 is threaded through the top of the frame 5 and to its lower end is attached a thermostat 8. A coil spring 9 is interposed between the thermostat 8 and disc 4, and its ends are connected to the thermostat and disc, so that when the thermostat contracts the disc will be slightly raised off the screws 6, opening the valve 3 to allow passage of fuel or oil into the outlet pipe 10. Upon the thermostat 8 expanding it will press upon spring 9, causing the disc 4 to seat more tightly upon the inner ends of bolts or screws 6 partly closing, or entirely closing the valve, and stopping flow of the fuel or oil.

It will be understood that variations of the temperature in the brooder, or the room, in which the device is positioned, will regulate the flow of gasolene or any suitable liquid.

While I have described the preferred embodiment of my invention, and have illustrated the same in the accompanying drawings, certain minor changes or alterations may appear to one skilled in the art to which this invention relates, during the extensive manufacture of the same, and I, therefore, reserve the right to make such alterations or changes as shall fairly fall within the scope of the appended claims.

What I claim is:

1. In a device of the class described, the combination of a valve casing, a frame mounted upon the upper end of said valve casing, a needle valve in said valve casing and extending into said frame, a plate or disc secured to the upper end of said needle valve, a pair of screws threaded through the bottom of said frame and bearing against the disc, a screw threaded through the top of the frame, a thermostat carried by the inner end of said last-mentioned screw, and a coil spring interposed between the thermostat and said disc and having its ends secured to the same.

2. In a device of the class described, the combination with an oil pipe, of a valve casing on said oil pipe, a frame on said valve casing, a needle valve in said valve casing and extending through the frame, a plurality of screws extending through the lower portion of the frame, a plate or disc connected to said needle valve and normally resting upon the inner ends of said screws, a thermostat within the frame, a coil spring connecting said thermostat and disc, and a screw extending through the upper portion of the frame and connected at its inner end to the thermostat.

In testimony whereof I hereunto affix my signature.

JOHN W. BRANSON.